(12) United States Patent
Dionne

(10) Patent No.: US 9,981,832 B1
(45) Date of Patent: May 29, 2018

(54) CONTROL PANEL ASSEMBLY

(71) Applicant: INDUSTRIES N.R.C. INC., Saint-Paul-d'Abbotsford (CA)

(72) Inventor: Francis Dionne, Saint-Jean-sur-Richelieu (CA)

( * ) Notice: Subject to any disclaimer, the term of this patent is extended or adjusted under 35 U.S.C. 154(b) by 0 days. days.

(21) Appl. No.: 15/710,135

(22) Filed: Sep. 20, 2017

(51) Int. Cl.
| B60K 26/00 | (2006.01) |
| B66C 13/18 | (2006.01) |
| B60R 16/023 | (2006.01) |
| B60P 3/12 | (2006.01) |
| B60P 1/54 | (2006.01) |

(52) U.S. Cl.
CPC .......... B66C 13/18 (2013.01); B60P 1/54 (2013.01); B60P 3/12 (2013.01); B60R 16/0238 (2013.01)

(58) Field of Classification Search
CPC .......... B60P 3/12; B60P 1/5433; B66C 13/18
USPC .......... 180/315, 320, 321, 331, 334
See application file for complete search history.

(56) References Cited

U.S. PATENT DOCUMENTS

| 3,784,035 | A | | 1/1974 | Dunbar | |
| 5,011,363 | A | * | 4/1991 | Conley, III | ............... B66F 9/10 |
| | | | | | 180/315 |
| 5,409,079 | A | * | 4/1995 | Strong | ............... B60K 20/00 |
| | | | | | 180/326 |
| 6,026,871 | A | * | 2/2000 | Chapman | ............. A01G 23/067 |
| | | | | | 144/24.12 |
| 6,086,142 | A | * | 7/2000 | Simmons | ........... B62D 33/0633 |
| | | | | | 296/190.01 |
| 6,092,975 | A | | 7/2000 | Cannon, Jr. et al. | |
| 6,431,346 | B1 | | 8/2002 | Gilmore et al. | |
| 6,746,067 | B2 | | 6/2004 | Schmidt et al. | |
| 6,752,468 | B2 | * | 6/2004 | Eliasson | ................. B60P 1/283 |
| | | | | | 180/331 |
| 7,654,457 | B2 | | 2/2010 | Wilson et al. | |
| 9,440,577 | B2 | | 9/2016 | McConnell et al. | |
| 9,783,056 | B2 | * | 10/2017 | Klein | ..................... B60K 37/00 |
| 2006/0237565 | A1 | | 10/2006 | Barker | |
| 2008/0162005 | A1 | | 7/2008 | Tang et al. | |
| 2009/0285662 | A1 | | 11/2009 | Addleman et al. | |
| 2010/0314001 | A1 | | 12/2010 | Kappel et al. | |
| 2013/0142604 | A1 | * | 6/2013 | Esparza | ................ B60P 1/5433 |
| | | | | | 414/546 |
| 2017/0273314 | A1 | * | 9/2017 | Bigott | .................. G06T 11/206 |

\* cited by examiner

*Primary Examiner* — Toan To
(74) *Attorney, Agent, or Firm* — Benoit & Cote, Inc.; C. Marc Benoit

(57) ABSTRACT

A control panel assembly for mounting to an interior compartment of a wrecker, the control assembly comprising an extendable arm assembly and a control panel. The extendable arm assembly is mounted to the interior compartment and comprises arms which are foldable relative to each other for adopting a compact configuration and an extended configuration. The control panel is mounted to the extendable arm assembly and comprises wrecker controls. The control panel is movable between an inner position, wherein the extendable arm assembly is in the compact configuration and the wrecker controls are located within the interior compartment, and an outer position, wherein the extendable arm assembly is in the extended configuration and the wrecker controls are located outside the interior compartment.

20 Claims, 13 Drawing Sheets

CONTROL PANEL ASSEMBLY

BACKGROUND

(a) Field

The subject matter disclosed generally relates to vehicles. More particularly, the subject matter disclosed relates to vehicle controls and vehicle accessories controls.

(b) Related Prior Art

In the field of recovery vehicle, there are recovery vehicle with masts and booms, a.k.a. tow vehicles or wreckers, including those that can be rotated, a.k.a. rotating wreckers, as well as those which cannot be rotated, and whose supporting travel base can be moved along the longitudinal axis of the wrecker to increase the reach of the boom. Such large wreckers, a.k.a. heavy wreckers, allow a large load to be lifted and then moved a given distance about the wrecker using hydraulic power.

Wreckers have hydraulic systems with hydraulic controls typically located on a control panel accessed through the sidewall of the unit. A controller module sends electrical signals through a wiring harness to actuate solenoids at the hydraulic control valve spools. Wireless remote control systems communicating by radio signal with the controller module have also been utilized. However, wrecker operators insist on redundant mechanical, manual back-up controls directly linked to the hydraulic valve, in the case of electrical failure. Such manual systems depend upon either mechanical linkages or cables, both of which restrict where the control levers and valves can be located.

The controls of a rotator or other heavy wrecker are typically located inside a control cabinet mounted on a sidewall of the wrecker, and are not as easily operable as they should be, particularly if the operator is less than average height or when operating conditions are far from optimal, e.g., on side roads along a ditch or a trench. The control cabinet and or control cabinet environment in the wrecker may participate in shielding the view of the operator or rendering the access to the controls difficult to the operator as the operator attempts to work the controls and establish necessary sight lines during operation of the hydraulics for controlling outrigger, boom and winch movement.

Wreckers also typically have separate and independent controls for hydraulic boom, hydraulic outrigger and/or underlift and electrical (e.g., lighting) systems. An underlift may be located in the rear of the wrecker. All these controls need to be accessible and operable.

Accordingly, it would be advantageous to improve wrecker controls, accessibility of wrecker controls and operability of wrecker controls. It would also be advantageous to provide wrecker controls that maintain the visibility of the operator on the wrecking operations as being able to eliminate redundant control levers. Further, it would be advantageous to provide operating stations integrating all wrecking controls to be used in a single wrecking station, comprising electrical and hydraulic controls, digital display and other appropriate monitoring and control components.

SUMMARY

According to an embodiment, there is disclosed a control panel assembly for mounting to an interior compartment of a wrecker, the control panel assembly comprising:

an extendable arm assembly mounted to the interior compartment, the extendable arm assembly comprises arms which are foldable relative to each other for adopting a compact configuration and an extended configuration; and a control panel mounted to the extendable arm assembly, wherein the control panel comprises wrecker controls;

wherein the control panel is movable between an inner position, wherein the extendable arm assembly is in the compact configuration and the wrecker controls are located within the interior compartment, and an outer position, wherein the extendable arm assembly is in the extended configuration and the wrecker controls are located outside the interior compartment.

According to an aspect, the extendable arm assembly, when deployed from the compact configuration to the extended configuration, imparts a movement to the control panel between the inner position and the outer position which follows an arc.

According to an aspect, the control panel is substantially within a plane at a given angle and the given angle remains substantially the same during a movement of the control panel between the inner position and the outer position.

According to an aspect, the extendable arm assembly comprises a left arm assembly, a right arm assembly and bridge assembly connecting the left arm assembly and the right arm assembly.

According to an aspect, the left arm assembly operates substantially according to a left operative plane, the right arm assembly operates substantially according to a right operative plane, and wherein the left operative plane and the right operative plane are parallel to each other.

According to an aspect, the extendable arm assembly comprises a plurality of rotational axes about which at least two of the arms of the extendable arm assembly fold about each other.

According to an aspect, the arms comprise a long arm with a proximal and a distal rotational axes, a short arm with a proximal and a distal rotational axes and a first intermediate arm comprising rotational axes, wherein two of the rotation axes of the first intermediate arm are respectively connected to the distal rotational axis of the short arm and to the distal rotational axis of the long arm, the proximal rotational axis of the long arm being forward and below the proximal rotational axis of the short arm, the distal rotational axis of the long arm being rearward and below the distal rotational axis of the short arm, wherein a deployment of the extendable arm assembly from the compact configuration to the extended configuration imparts a movement to the first intermediate arm which follows an arc and imparts a rotation of the first intermediate arm.

According to an aspect, the arms comprise a second intermediate arm with two rotational axes and extendable arm assembly comprises a head support member flange with two rotational axes, wherein the first intermediate arm comprises four rotational axes, wherein a first one of the four rotational axes is connected to the distal rotational axis of the long arm, a second one of the four rotational axes is connected to the distal rotational axis of the short arm, a third one of the four rotational axes is connected to a first one of the two rotational axes of the second intermediate arm and a fourth one of the four rotational axes is connected to one of the two rotational axes of the head support member flange, wherein the control panel is mounted to the extendable arm assembly through head support member flange.

According to an aspect, a distance between the two rotational axes of the head support member flange is equal to a distance between the third one of the four rotational axes of the first intermediate arm and a second one of the two rotational axes of the second intermediate arm.

According to an aspect, the interior compartment comprises a framing member defining an opening through which the control panel exits when moving from the inner position to the outer position, wherein at least part of the control panel in the outer position is located below the opening.

According to an aspect, the interior compartment comprises an opening and a door for closing the opening, and wherein the extendable arm assembly operates independently from the door.

According to an aspect, the interior compartment further comprises a control bus port, and wherein the control panel assembly further comprises a control cable connected to the control bus port.

According to an aspect, the control panel assembly further comprises a head support member mounted to the extendable arm assembly, the head support member comprises a connecting surface which is substantially flat and on which the control panel is mounted.

According to an aspect, the connecting surface is substantially within a plane at a given angle and the given angle remains substantially the same during a movement of the connecting surface between the inner position and the outer position.

According to an embodiment, there is disclosed a method of operating a control panel assembly comprising wrecker controls, the control panel being mounted to an interior compartment of a wrecker, the method comprising:

providing an extendable arm assembly mounted to the interior compartment, the extendable arm assembly comprising arms which are foldable relative to each other;

applying a pulling force on at least one of the control panel and a part of the extendable arm assembly, whereby the extendable arm assembly has arms which unfold from each other and the wrecker controls exit the interior compartment; and operating the control panel located outside the interior compartment.

According to an aspect, the method further comprises opening a door which prevents access to the interior compartment, wherein the steps of opening the door and applying a pulling force are performed independently from each other.

According to an aspect, the method further comprises:

applying a pushing force over one of the control panel and a part of the extendable arm assembly, whereby the extendable arm assembly has arms folding relative to each other and the wrecker controls enter the interior compartment; and closing the door, thereby preventing access to the interior compartment.

According to an embodiment, there is disclosed a wrecker comprising:

a body;

an interior compartment supported by the body;

control panel assembly for mounting within the interior compartment, the control panel assembly comprising:

an extendable arm assembly mounted to the interior compartment, the extendable arm assembly comprises arms which are foldable relative to each other for adopting a compact configuration and an extended configuration; and a control panel mounted to the extendable arm assembly, wherein the control panel comprises wrecker controls;

wherein the control panel is movable between an inner position, wherein the extendable arm assembly is in the compact configuration and the wrecker controls are located within the interior compartment, and an outer position, wherein the extendable arm assembly is in the extended configuration and the wrecker controls are located outside the interior compartment.

According to an aspect, the extendable arm assembly, when deployed from the compact configuration to the extended configuration, imparts a movement to the control panel between the inner position and the outer position which follows an arc.

According to an aspect, the control panel is substantially within a plane at a given angle and the given angle remains substantially the same during a movement of the control panel between the inner position and the outer position.

BRIEF DESCRIPTION OF THE DRAWINGS

Further features and advantages of the present disclosure will become apparent from the following detailed description, taken in combination with the appended drawings, in which:

FIGS. 15-18 provide views of all components of left arm assembly and of the bridge members of the extendable arm assembly that are visible according to the left side view.

It will be noted that throughout the appended drawings, like features are identified by like reference numerals.

DETAILED DESCRIPTION

In the present description, there is disclosed a control panel assembly for vehicles that include a hydraulic system with associated controls. The control panel assembly is to be mounted in an interior compartment of the wrecker and is movable between an inner position in the interior compartment and an outer position outside the interior compartment.

Figure 1:
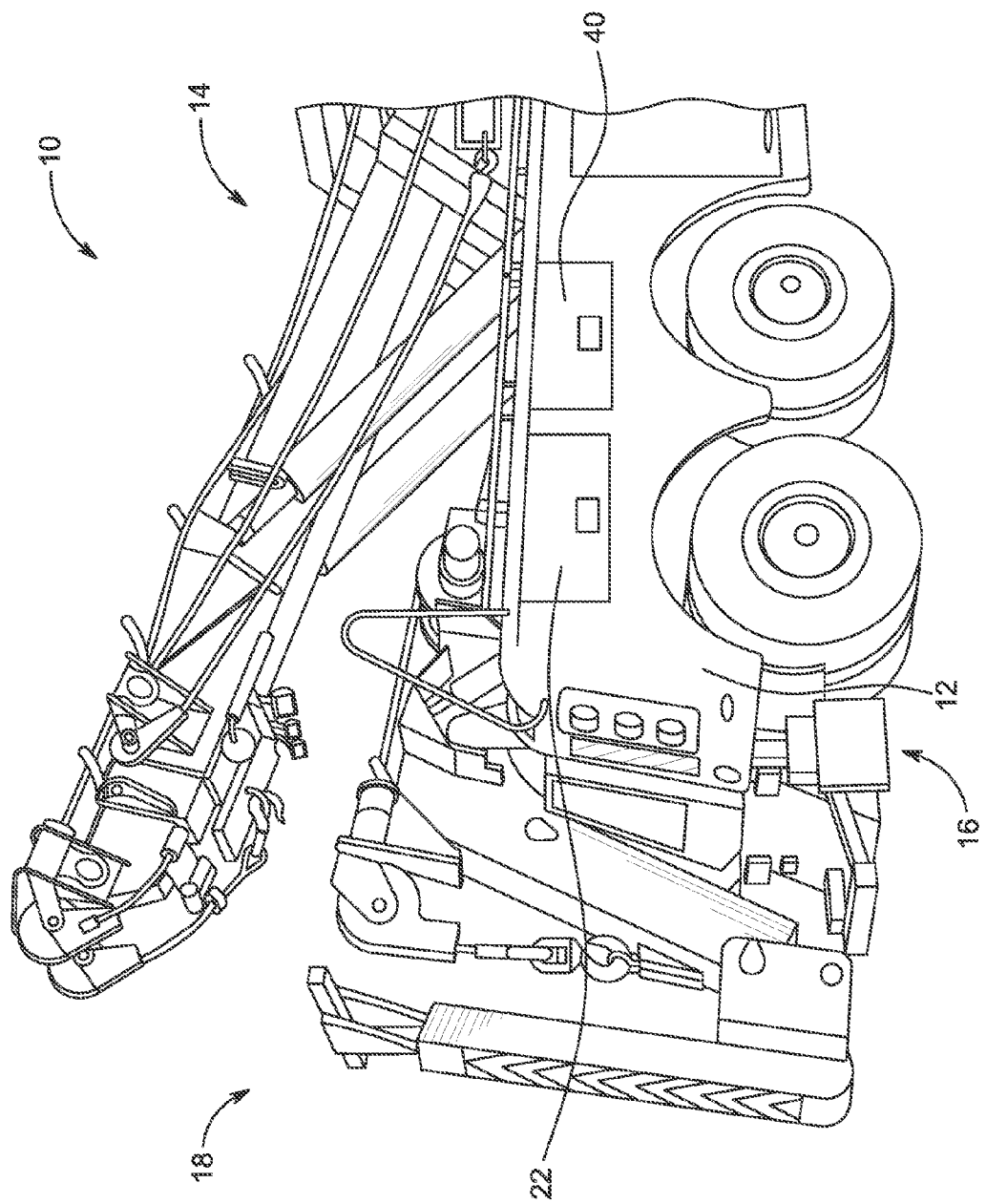
FIG. 1 is a perspective view of the rear of a wrecker in accordance with an embodiment.

Referring now to the drawings, and more particularly to FIG. 1, the wrecker 10 comprises a body 12 mounted on a main frame 16. The wrecker 10 comprises a telescoping boom 14 mounted on rotating bearings, which is in turn mounted on travel base assembly. The travel base assembly moves over travel tubes mounted on the main frame 16 along the longitudinal axis of the main frame 16 of the wrecker 10. The travel base is mounted on bearing pads or alternatively on one or more traveler rollers to be able to travel over the tubes. The wrecker 10 further comprises a drag winch assembly 18 mounted on the rear portion of the main frame 16 of the wrecker 10. The wrecker body 12 comprises interior compartments along at least one of its side, the interior compartments comprising a control cabinet 40 and a tool cabinet 22. The control cabinet 40 and the tool cabinet 22 are accessible from the outside of the wrecker 10, to access the content of the cabinets 22, 40. It should be noted that the location of the control cabinet 40 and of the tool cabinet 22 could be interchanged (i.e., the control cabinet 40 closer to the rear of the wrecker 10 and the tool cabinet 22 closer to the front of the wrecker 10). Furthermore, according to other embodiments, cabinets 22, 40 are located on the opposite side of the wrecker 10. The control cabinet 40 is an example of an interior compartment of a wrecker 10.

The control cabinet 40 houses a control panel (not shown in FIG. 1, but discussed later). An issue with some prior art control panels is that, due to their locations, an operator may have difficulty accessing it when it is located in the control cabinet 40, particularly when the wrecker 10 is on uneven ground or when the door of the control cabinet 40 is obstructing at least in part access to its interior compartment of the control cabinet 40.

Figure 2:
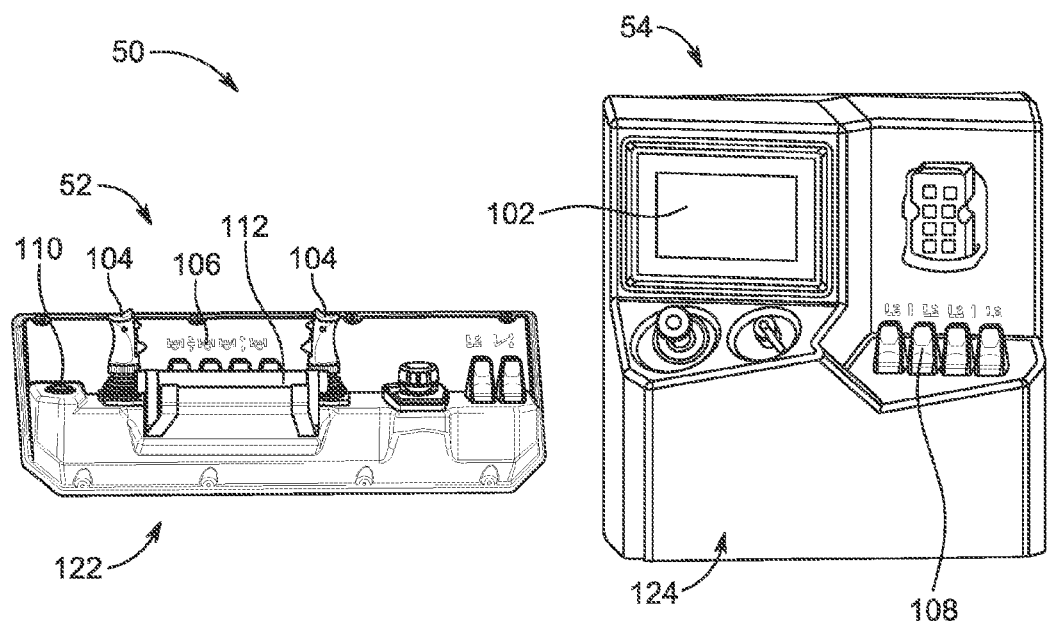
FIG. 2 is a perspective view of the control panels of the wrecker of FIG. 1.
Figure 3:
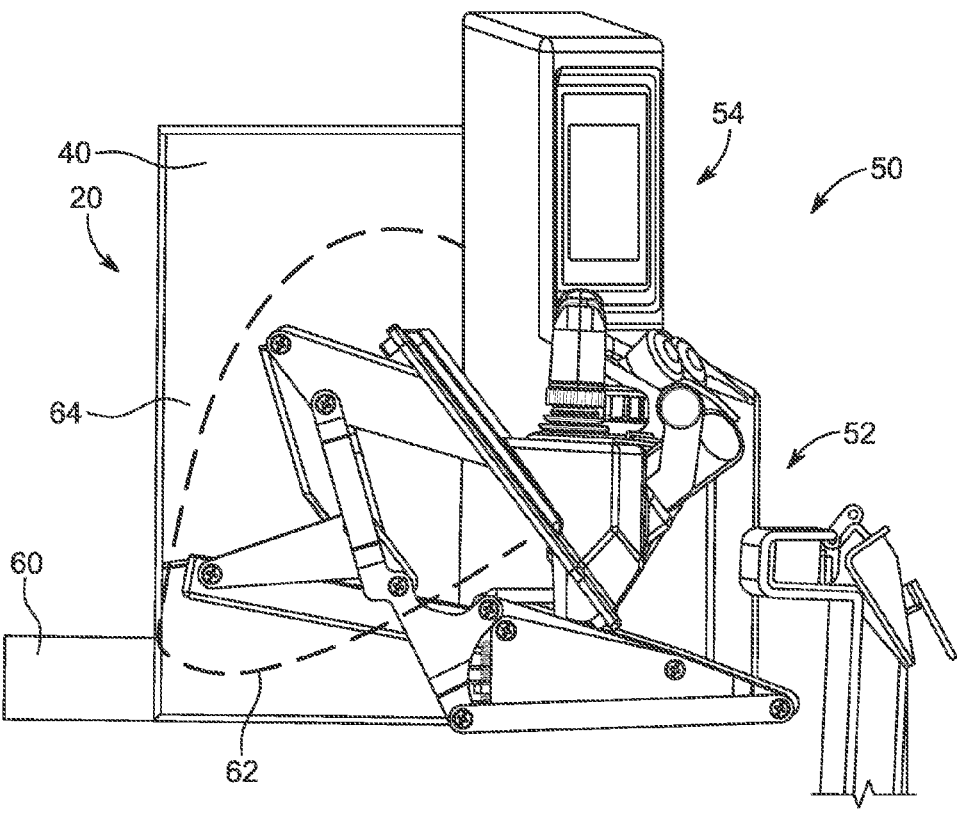
FIG. 3 is a perspective view of the control panels of the wrecker of FIG. 2.

Now referring additionally to FIGS. 2 and 3, wrecker controls 50 comprise a control panel 52 which is movable and a control panel 54 which is static. The wrecker controls 50 are, according to an embodiment, made of a composite material to resist to weather conditions to which the wrecker controls 50 are exposed.

According to a non-limiting example, the wrecker controls 50 have on an operative face 122, 124, a monitor or touchscreen 102 (e.g., CAN Bus PV780 touchscreen display), manual joystick 104 and paddle controls 106, underlift control buttons 108, and an emergency stop button 110. In one example, left joystick 104 provides control over the telescopic boom 14 (e.g., in/out, up/down, and "twist" for swing of the telescopic boom 14, by rotating the bearing about its vertical axis), using a boom lift cylinder, as well as telescoping cylinders to extend or retract the telescopic boom; the joysticks 104 on the right controls movement of the drag winch assembly 18, including "twist" for its travel; and paddle controls 106 are used to control auxiliary winches located, for example, outboard and rear of a turret base, which is able to rotate with the telescopic boom 14. According to an example, one or more of the joysticks 104, or other manual levers, are used to move a travel assembly along the travel tubes, carrying the telescopic boom 14 in a direction along the longitudinal axis of the main frame 16.

Wrecker controls 50 are shown as being divided between the control panel 52 and the static control panel 54. The static control panel 54 comprises a touchscreen 102 used to extend or retract wrecker hydraulic outrigger legs, as is known in the art, in order to stabilize the wrecker 10 during recovery operations. Underlift controls buttons 108 are used to extend or retract an underlift located at the rear end of the wrecker 10, to allow recovery of a disabled vehicle by its front wheels, for example. Additional commands may be available through the touchscreen 102, such as control of lighting functions of the wrecker 10. The wrecker controls 50 thus provide interfaces and controls to operate both electric-based components and hydraulic-based components of the wrecker 10.

The control panels 52 and 54 are connected to a control bus port 60 electrically, mechanically and/or alternatively connected to a controller commanding the components of the wrecker 10, or directly to some of the components of the wrecker 10 to be controlled by the operator. As illustrated on FIG. 3, the control panels 52 and 54 are connected to the control bus port 60 through control cables 62, 64 traveling in the control cabinet 40. The control bus port 60 therefore processes/relays signals from the control panels 52, 54 to the controller for the operation of the wrecker components.

Figure 4:
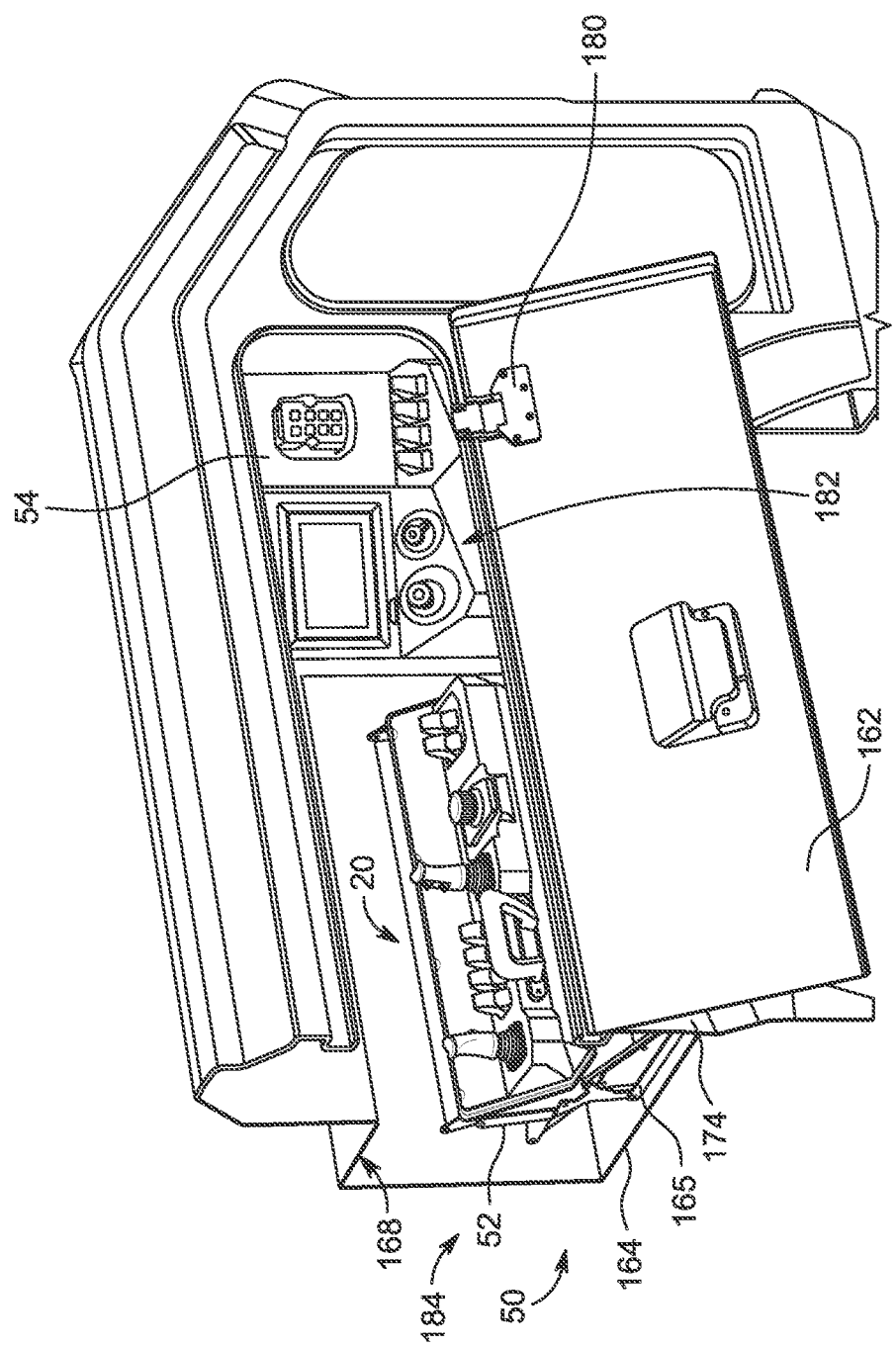
FIGS. 4 and 5 are perspective views of the control panels of a wrecker vehicle with the moveable control panel mounted to an extendable arm assembly in the control cabinet, the extendable arm assembly being illustrated in a compact configuration and in an extended configuration respectively according to an embodiment.
Figure 5:
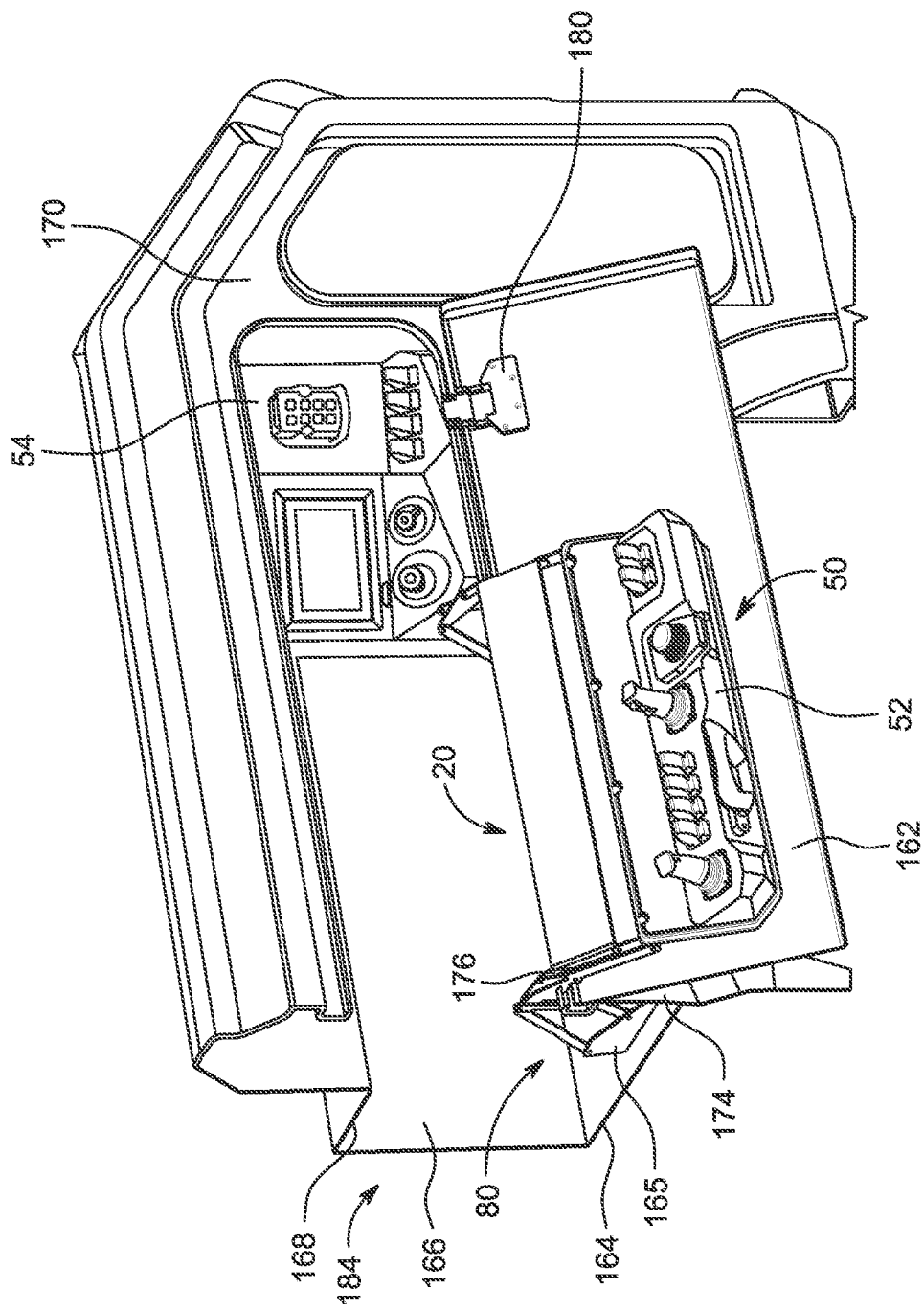

Now referring additionally to FIGS. 4 and 5, the control cabinet 40 comprises a door 162 mounted on hinges 180 (a single one shown) and operable between a closed position (see FIG. 1) and an open position (see FIGS. 4 and 5). The control cabinet 40 comprises an opening 182 substantially closed by the door 162 when the door 162 is in the closed position preventing access to the interior of the control cabinet 40, and substantially accessible by an operator located beside the body 12 (FIG. 1) near the door 162 when the door 162 is in the open position. The control cabinet 40 forms a closed compartment (i.e., interior compartment) comprising a floor 164, a back wall 166 and a ceiling 168. Side walls (not shown) complete the closing of the control cabinet 40. Typically, the control cabinet 40 further comprises a front wall 170 part of the body 12 (FIG. 1), with the opening 182 being located in the front wall 170. The vertical size of the opening 182 is typically smaller than the interior height of the control cabinet 40 defined by the floor 164 and the ceiling 168. Accordingly, a framing member 174 of the front wall 170 extends above the floor 164 partially obstructing access to an operator to the interior compartment 184 of the control cabinet 40.

FIG. 4 shows the wrecker controls 50 located in the interior compartment 184, protected from weather conditions. FIG. 5 shows the control panel 52 displaced from within the interior compartment 184 to outside the interior compartment 184, the control panel 52 being located, according to the perspective of an operator located beside the wrecker 10 facing the door 162, in front of the door 162 and below the bottom edge 176 of the opening in the framing member 174 for easy manipulation an operator. The control panel 52 is further located with its lowermost portion lower than the floor 164. The orientation of the control panel 52 when located in the interior compartment 184 and outside the interior compartment 184 remains functionally identical: having its operative face 122 facing generally forward and upward or, in other words, away from back wall 166 and floor 164.

Figure 19:
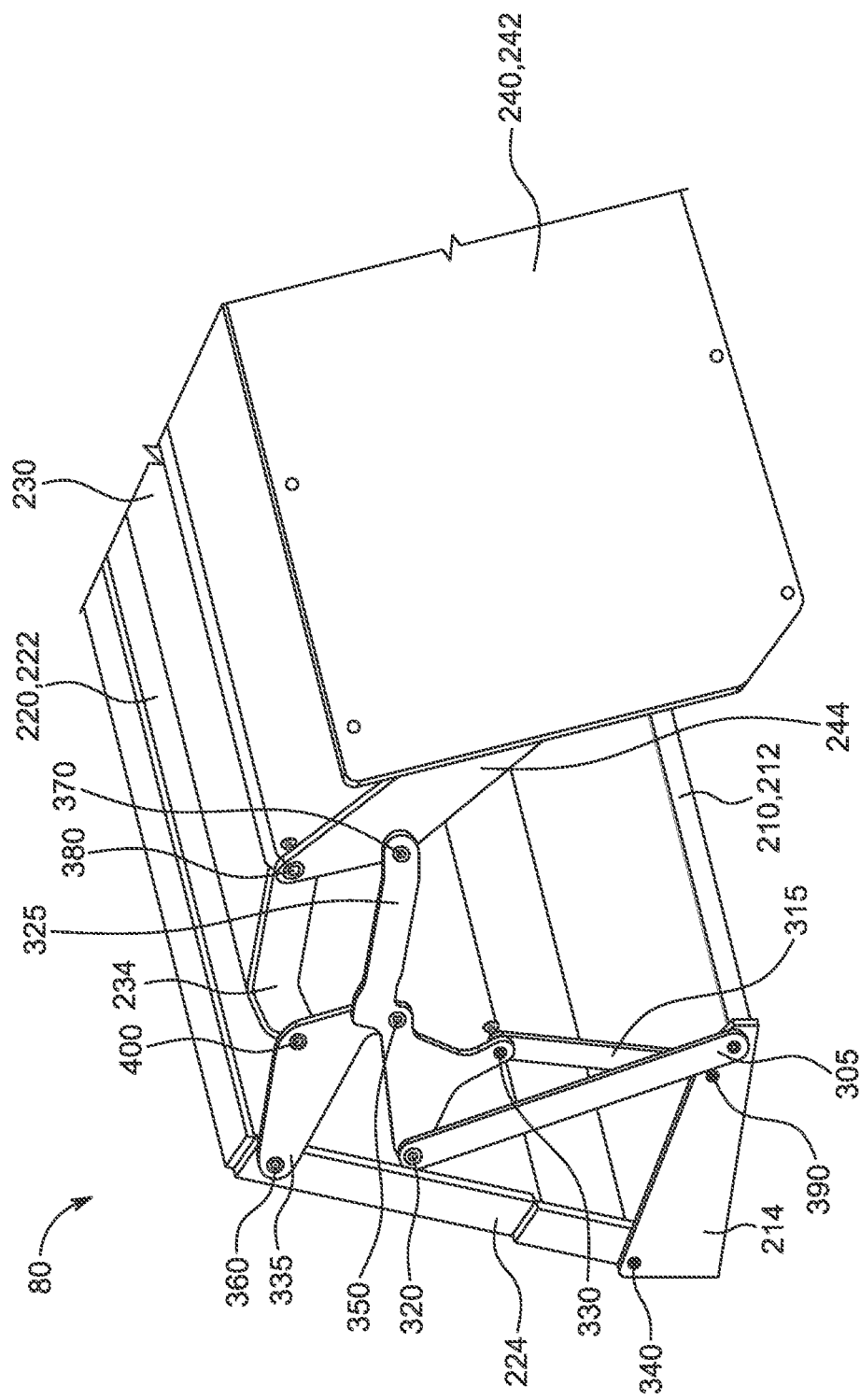
FIG. 19 is a perspective view of the extendable arm assembly in an extended configuration according to an embodiment.

According to an embodiment illustrated in FIGS. 4 and 5, there is shown a control panel assembly 20 for mounting to an interior compartment 184 of a wrecker, the control panel assembly 20 comprising an extendable arm assembly mounted to the interior compartment 184, the extendable arm assembly 80 comprises arms which are foldable relative to each other for adopting a compact configuration (FIGS. 4 and 10) and an extended configuration (FIGS. 5 and 19); and a control panel 52 mounted to the extendable arm assembly 80, wherein the control panel 52 comprises wrecker controls 50; wherein the control panel 52 is movable between an inner position (FIGS. 4 and 10), wherein the extendable arm assembly is in the compact configuration and the wrecker controls 52 are located within the interior compartment 184, and an outer position (FIGS. 5 and 19), wherein the extendable arm assembly 80 is in the extended configuration and the wrecker controls 52 are located outside the interior compartment 184.

According to an embodiment, the extendable arm assembly 80, when deployed from the compact configuration to the extended configuration, imparts a movement to the control panel 50 between the inner position and the outer position which follows an arc.

According to an embodiment, the control panel 52 is substantially within a plane at a given angle and the given angle remains substantially the same during a movement of the control panel 52 between the inner position and the outer position.

Figure 6:
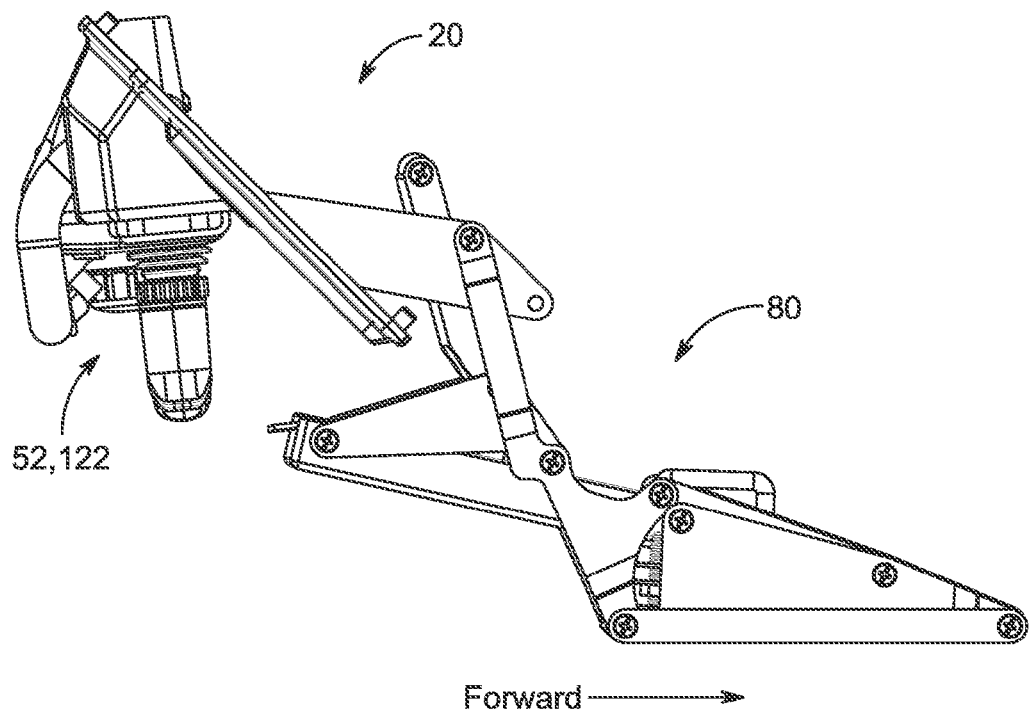
FIGS. 6 and 7 are side views of the extendable arm assembly with a moveable control panel mounted thereto in a mounting configuration and in an operative configuration respectively according to an embodiment.
Figure 7:
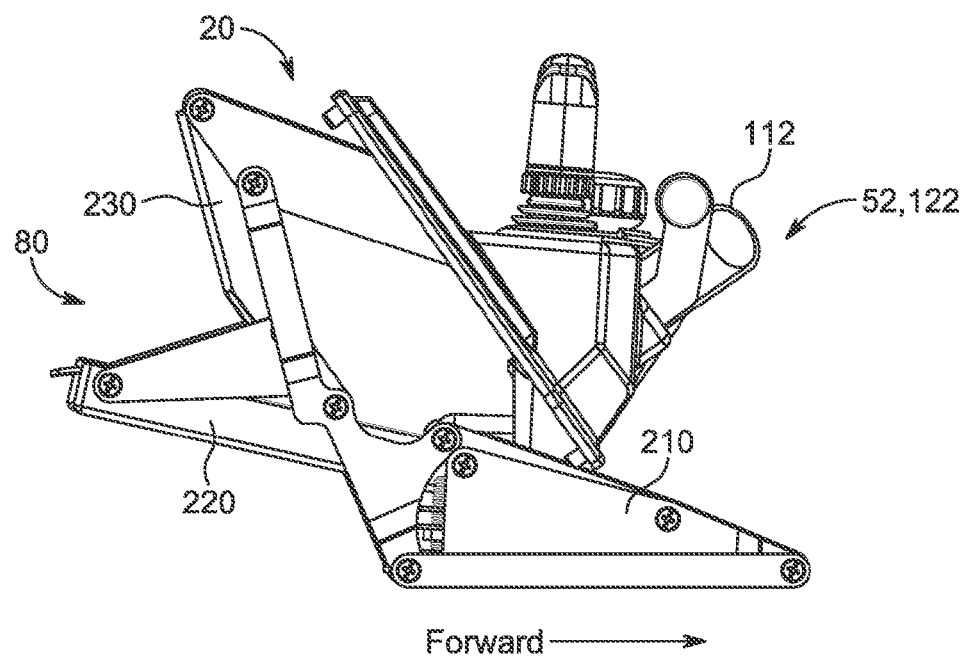

Now referring to FIGS. 6 and 7, there is shown a control panel assembly 20 comprising the control panel 52 mounted to an extendable arm assembly 80 itself mounted to the control cabinet 40. The extendable arm assembly 80 is, according to an embodiment, mounted to the floor 164 (FIGS. 4 and 5). FIG. 6 shows the control panel 52 is a non-operative mounting configuration upon its mounting on the extendable arm assembly 80. FIG. 7 shows the control panel 52 mounted on the extendable arm assembly 80 in an operative configuration, its operative face 122 facing forward in a direction from the back wall 166 to the front wall 170 (not shown on FIGS. 6 and 7). It must be noted that once mounted in an operative configuration, the control panel 52 is fastened in that configuration. It may be unfastened and rotated in the non-operative mounting configuration for maintenance.

Figure 8A:
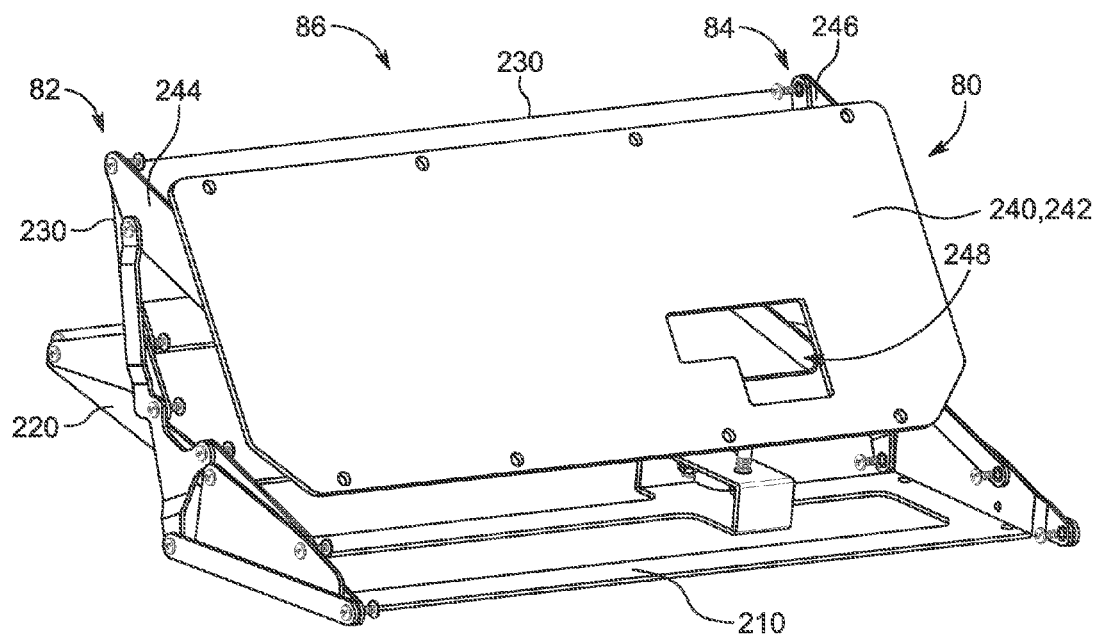
FIGS. 8A-8B are perspective views of the extendable arm assembly with and without the head support member respectively according to an embodiment.
Figure 8B:
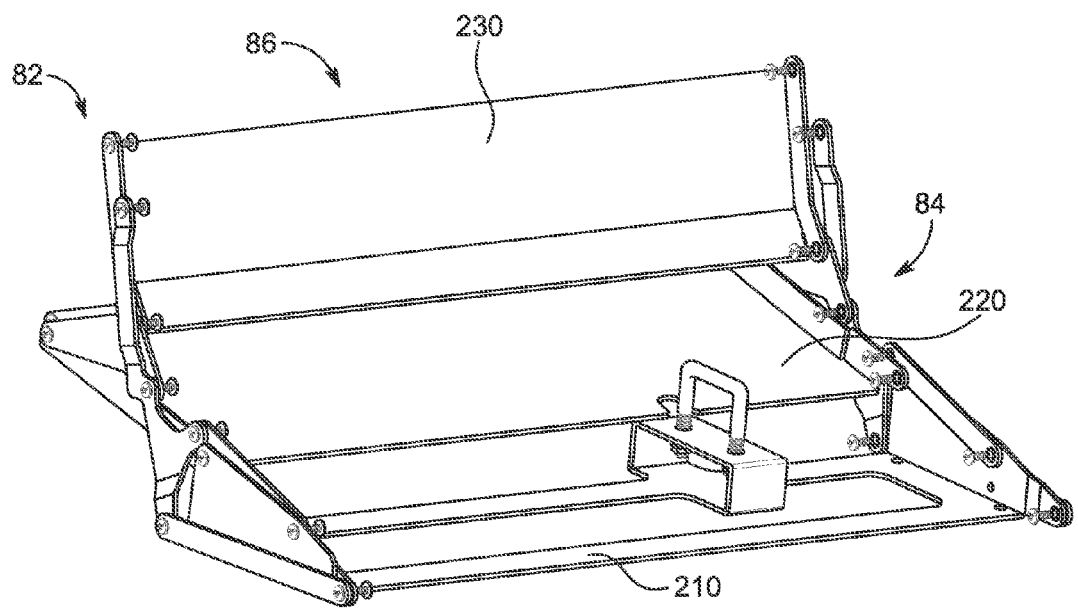
Figure 9:
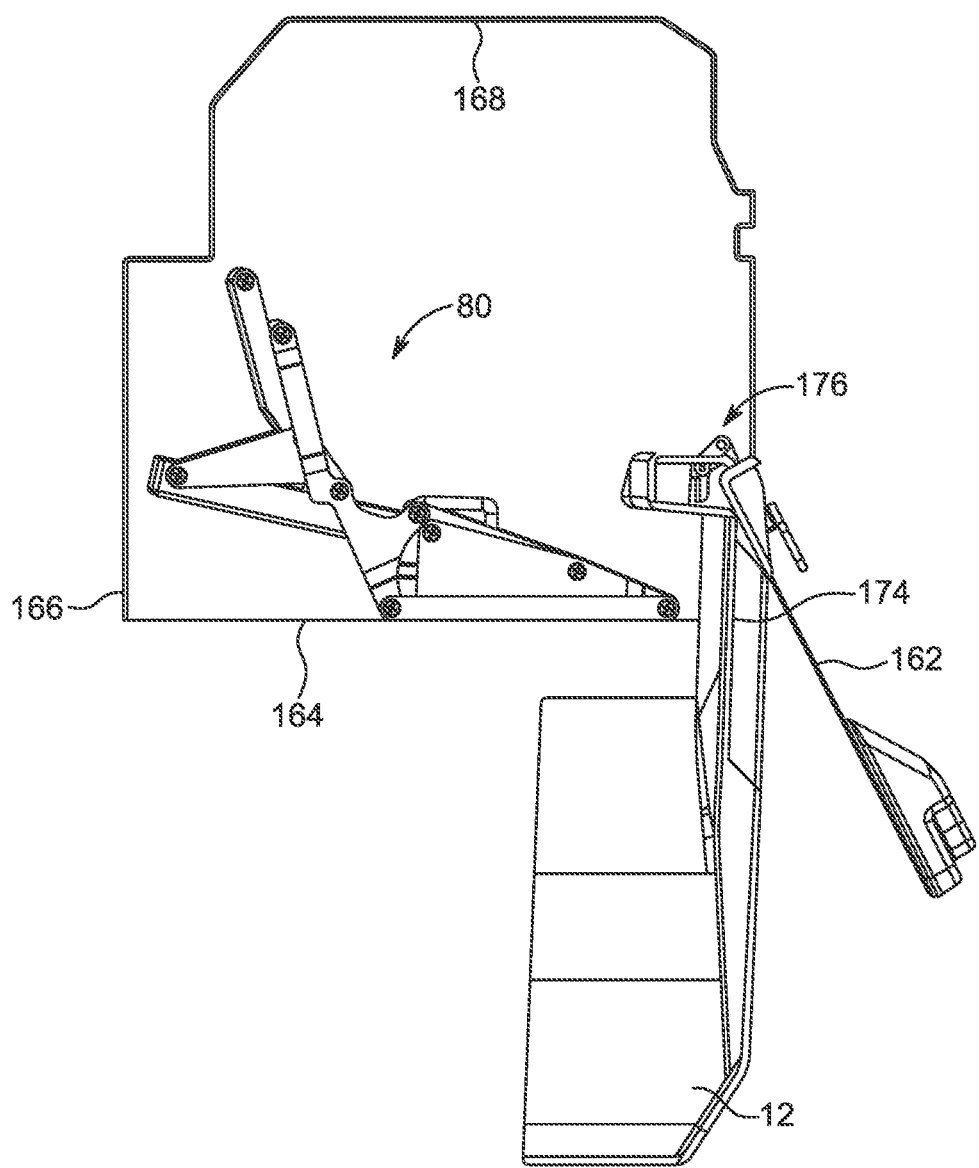
FIG. 9 is a side view of the extendable arm assembly mounted in the control cabinet according to an embodiment with the control cabinet shown in a partial cross-sectional view.

Now referring additionally to FIGS. 8A, 8B and 9, the extendable arm assembly 80 comprises a plurality of arms foldable relative to each other divided between a left arm assembly 82 and a right arm assembly 84. The extendable arm assembly 80 further comprises a bridge assembly. The bridge assembly comprises a bridge linking the left arm assembly 82 and the right arm assembly 84.

According to an embodiment, the bridge assembly comprises bridge members 86 mounted to the left arm assembly 82 and to the right arm assembly 84. The bridge members 86, depending on which one and their configuration, also include arms which form part of both the left arm assembly 82 and the right arm assembly 84. One or more of the bridge members 86 further is for mounting the extendable arm assembly 80 in the control cabinet 40, for structural and robustness purpose and/or as a mount for the control panel 52. According to an embodiment, bridge members 86 comprise head support member 240, floor member 210, first intermediate member 220 and second intermediate member 230.

As shown on FIG. 9, the extendable arm assembly 80 (illustrated without the head support member 240, see FIG. 10) is for mounting in the control cabinet 40, with the portion of the framing member 174 and the door 162 illustrated. The extendable arm assembly 80 is mounted below the bottom edge 176 of the opening in the framing member 174 and bellow the hinged edge of the door 162.

Now referring particularly to FIGS. 8A, 8B and 10 to 14, the extendable arm assembly 80 comprises among the bridge members 86 a floor member 210. The floor member 210 is fastened to the floor 164 at an anchoring point 165 of the control cabinet 40 with appropriate means. According to embodiments, the floor member 210 may be fastened using bolts, screws, rivets, being welded and/or glued to the floor 164 to list non-limiting examples. The floor member 210 comprises a flat connecting portion 212, a left flange 214 and a right flange 216 extending perpendicular to the flat connecting portion 212 and on which are mounted the left arm assembly 82 and the right arm assembly 84.

Figure 10:
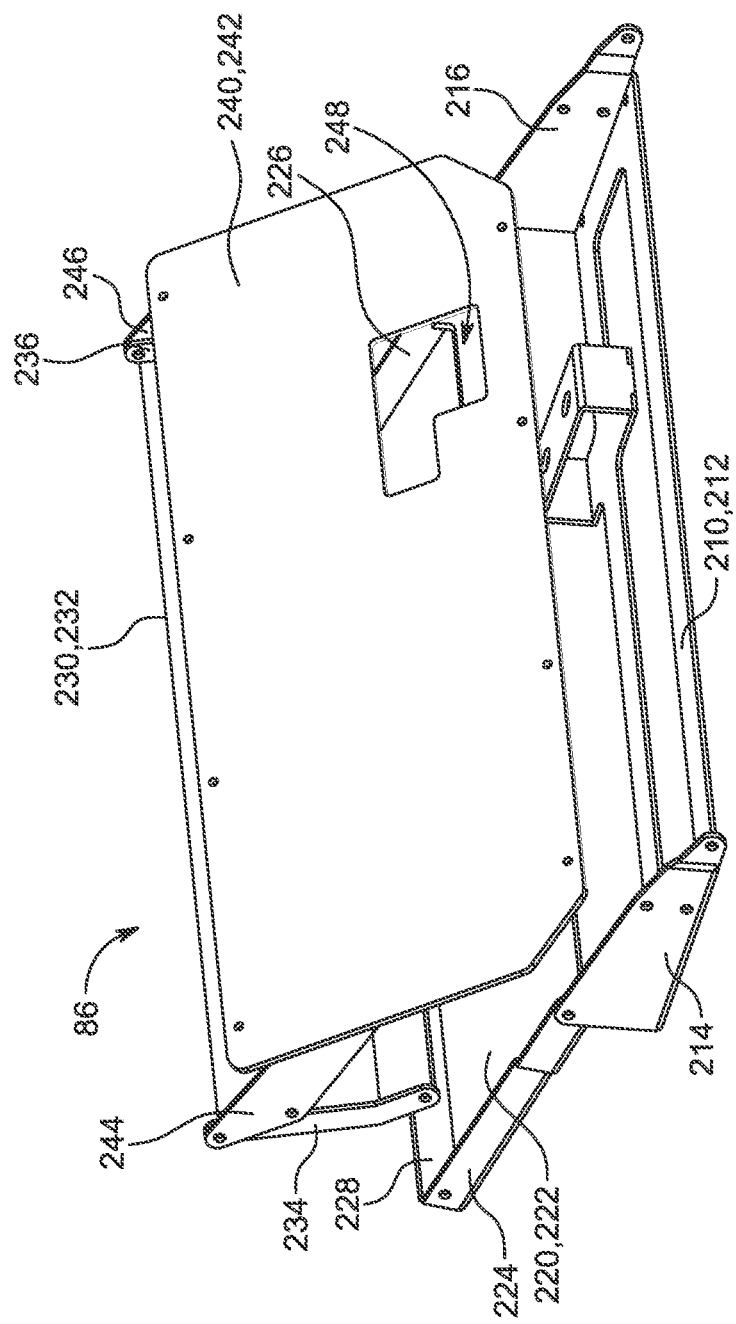
FIG. 10 is a perspective view of portions of the extendable arm assembly according to an embodiment.

A first intermediate member 220 is mounted to the floor member 210, more precisely to the left flange 214 and the right flange 216. The first intermediate member 220 comprises a flat connecting portion 222 (FIG. 10), a left flange 224, a right flange 226, and a back flange 228 (FIG. 10). The flanges 224, 226, 228 extend on three of the four sides of the contour of the flat connecting portion 222. The left and right flanges 224, 226 are for the mounting of the left arm assembly 82 and the right arm assembly 84. The back flange 228 provides rigidity to the first intermediate member 220 against deformation upon a force applied along a vertical plane on the first intermediate member 220. The first intermediate member 220 further comprises a resilient component 250 (e.g., a spring) that applies a force to dampen the movement of the extendable arm assembly 80 in both directions when moving between a compact configuration and an extended configuration.

The second intermediate member 230 is mounted on arms of the left arm assembly 82 and the right arm assembly 84 its left-right extremities. The second intermediate member 230 comprises a partially folded connecting portion 232 with a left flange 234 and a right flange 236 ensuring rigidity and providing surfaces for mounting to arms of the left arm assembly 82 and the right arm assembly 84.

The head support member 240, mounted on extremities of arms of the left arm assembly 82 and right arm assembly 84, provides a surface on which is mounted the control panel 52 using releasable fastening means such as bolts, screws, and clips as non-limiting examples. The head support member 240 comprises a connecting surface 242 on which is mounted the control panel 52, a left flange 244 (aka head support member flange) mounted on two arms of the left arm assembly 82, and a right flange 246 mounted to two arms on the right arm assembly 84. The left flange 244 and the right flange 246 extend substantially perpendicularly to the connecting surface 242. The left flange 244 and right flange 246 are fixed to the connecting surface 242 using appropriate means, such as welding. The connecting surface 242 further comprises an opening 248 for the control cable 62 to travel from the control panel 52 towards the control bus port 60 (FIG. 3). According to an embodiment, the connecting surface 242 is substantially flat.

Now referring to FIGS. 15 to 18, the extendable arm assembly 80 comprises two arm assemblies 82, 84 connected to each other through the bridge members 86. For brevity, the following text describes only the left arm assembly 82. The right arm assembly 84 operates in a similar fashion and the components and assembly of the right arm assembly 84 are the mirror image of the left arm assembly 82. The arm assemblies 82, 84 operate substantially according to vertical planes, the operative plane of the left arm assembly 82 (aka the left operative plane) being parallel to the operative plane of the right arm assembly 84 (aka the right operative plane).

The setup of the left arm assembly 82 comprises a series of arms mounted to each other and to the bridge members 86 (FIG. 10) allowing the left arm assembly 82 to be in a compact configuration and in an extended configuration. The symmetry of the left arm assembly 82 and the right arm assembly 84, with the bridge components connecting similar arm components of the left arm assembly 82 and the right arm assembly 84 ensures synchronized movements of the left arm assembly 82 and of the right arm assembly 84.

For teaching purposes, the following description will use the following references: up and top being the direction from the floor 164 toward the ceiling 168 of the control cabinet 40; low and bottom being the direction from the ceiling 168 toward the floor 164 and location of the floor 164; back and rear being the direction from the front wall 170 toward the back wall 166 and location of the back wall 166; and front being the direction from the back wall 166 toward the front wall 170. Clockwise refers to a rotation from a left side point of view. Counterclockwise refers to the opposite rotation.

Further, in the following, arms and other components are described as capable of rotating relative to each other about a rotational axis. In order to rotatively link components, according to an embodiment, a combination of nuts, bolts and washers are used. According to another embodiment, rivets and washers are used to provide such rotary links. These examples are provided for teaching purpose only and are not limiting options to provide rotative links that are intended to also be encompassed in the present description.

Now, starting from an anchoring point (not shown), the floor member 210 is fastened to the floor (not shown). Two arms (long arm 305 and short arm 315) and the first intermediate member 220 are respectively connected about three rotational axes 310, 390, 340 to the left flange 214 which extends from the floor member 210. The left flange 214 defines a substantially triangular shape, the top of the triangular shape being located at the back. The arm 305 is connected at one of its extremity about the front axis 310 (aka proximal rotational axis of the long arm) located substantially at the front of the left flange 214. The arm 305 is connected to the exterior of the left flange 214.

The first intermediate member 220 is connected at its front about the back axis 340 (aka distal rotational axis of the short arm) located substantially at the top and at the back of the left flange 214. The exterior of the left flange 224 is connected to the interior of the left flange 214. The first intermediate member 220 thereby joins the left arm assembly 82 and the right arm assembly 84 and rotates relative to the floor member 210. The arm 315 is connected at one if its extremity about the axis 390 (aka proximal rotational axis of the short arm) located at an intermediate position between the front axis 310 and the back axis 340 and slightly upwardly offset relative to a straight line joining the front axis 310 and the back axis 340. The arm 315 is connected to the interior of the left flange 214.

The arm 325 (aka the first intermediate arm) is connected about four rotational axes 320, 330, 350 and 370. Three axes 320, 350 and 370 are substantially aligned, with the fourth axis 330 being forwardly offset. The axis 320 (aka distal rotational axis of the long arm) is for connecting the arm 325 to the arm 305; the axis 320 being located at the other extremity of the arm 305 distant from the front axis 310. The arm 325 is connected to the arm 315. The axis 330 is for connecting the arm 325 to the arm 315; the axis 330 being located at the other extremity of the arm 315 distant from the axis 390. The arm 325 is connected to the interior of the arm 305 about axis 320. The axes 350 and 370 will be discussed later.

The arm 335 (aka the second intermediate arm) is connected about three rotational axes: the axis 360, the axis 350 and the axis 400. The axis 360 is for connecting to the left flange 224. The arm 335 is connected to the exterior of the left flange 224. The arm 335 is connected to the interior of the arm 325 about axis 350. The axis 350 is for connecting to the left flange 234 of the second intermediate member 230 as will be explained in more details.

Further in reference to FIGS. 8A-8B, the second intermediate member 230 is connected about two axes: the axis 400 and the axis 380. The top of left flange 234 is connected to the left flange 244 about the axis 380. The bottom of left flange 234 is connected to the interior of the arm 335 about the axis 400.

The head support member 240, through its left flange 244, is connected to the second intermediate member 230 (left flange 234) about the axis 380, and to the arm 325 about the axis 370. The flanges 244, 246 therefore extends forward toward the connecting surface 242. The connecting surface 242 is sloped relatively to the longitudinal direction of the flanges 244, 246, providing on the front face of the connecting surface 242 a surface for receiving the control panel 52 facing both toward the front and upward.

Referring additionally to FIGS. 7, 9, 15 and 19, the arm assemblies 82, 84 are conceived such that a force pulling the control panel 52 through the handle 112, the bridge members 86 and the arm assemblies 82, 84 in an upward direction results in the arms 305 and 315 rotating clockwise. The arm 325 moves accordingly upward and the axis 370 located distant from the axes 310 and 330 moves frontward. The axis 360 located on the left flange 224 distant from the back axis 340 rotates also clockwise, resulting in the first intermediate member 220 rotating clockwise toward a vertical orientation, the second intermediate member 230 moving forward toward a counter-sloped direction (the top edge of the second intermediate member 230 (i.e., axis 380) in the compact configuration being below the previous position of axis 380 in the extended configuration), and the head support member 240 being moved frontward below the second intermediate member 230 while having kept its operative face 122 facing forward and upward.

Figure 11:
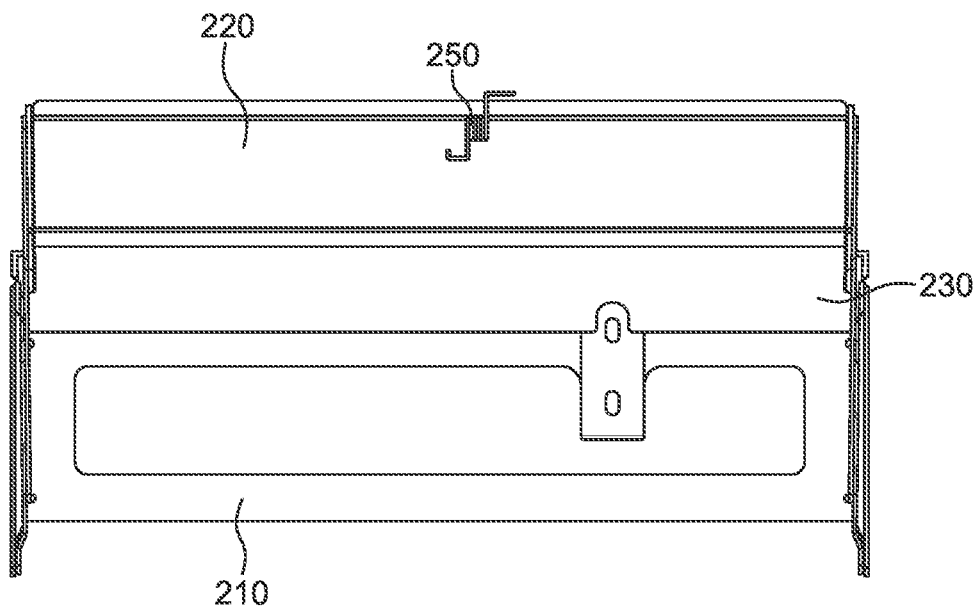
FIG. 11 is a top view of portions of the extendable arm assembly according to the embodiment of FIG. 10.
Figure 12:
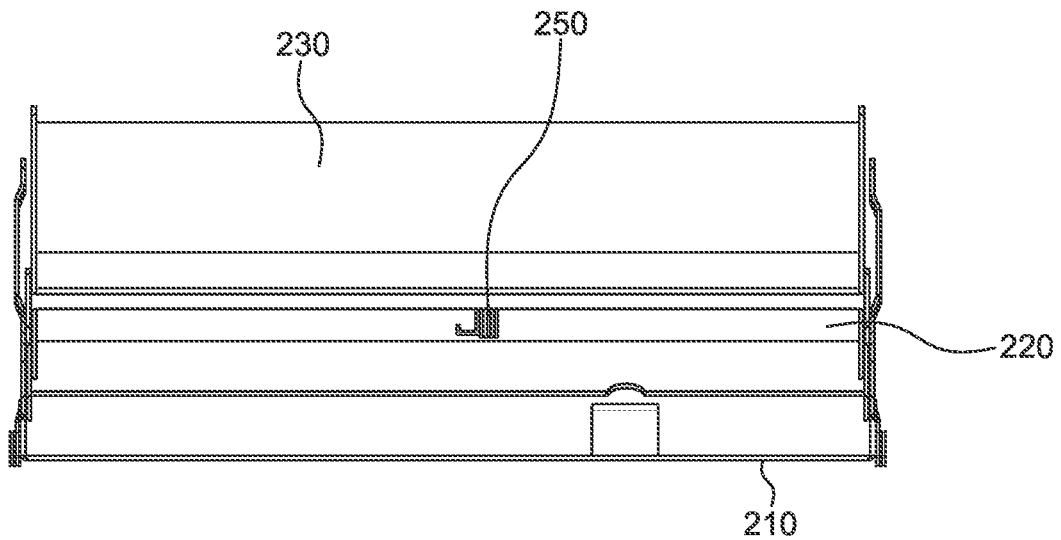
FIG. 12 is a front view of portions of the extendable arm assembly according to the embodiment of FIGS. 10-11.
Figure 13:
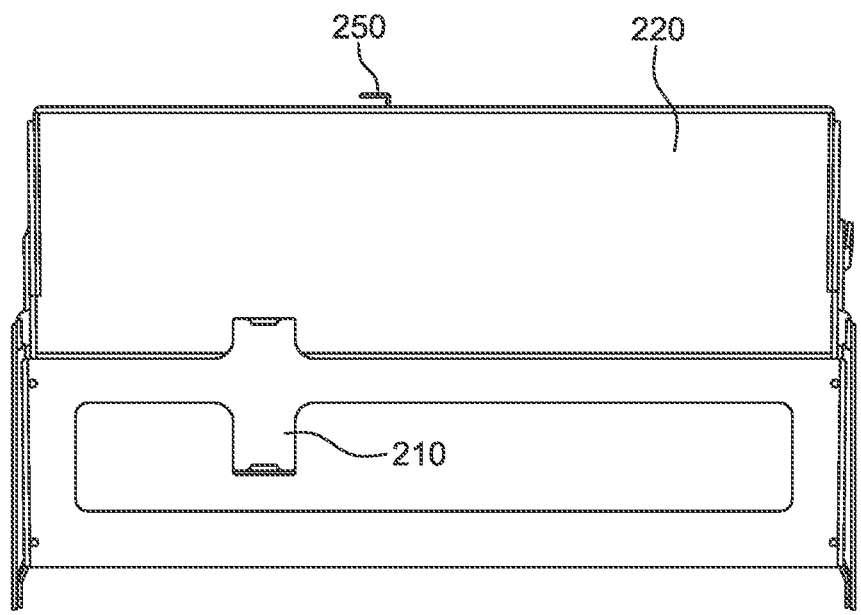
FIG. 13 is a bottom view of portions of the extendable arm assembly according to the embodiment of FIGS. 10-12.
Figure 14:
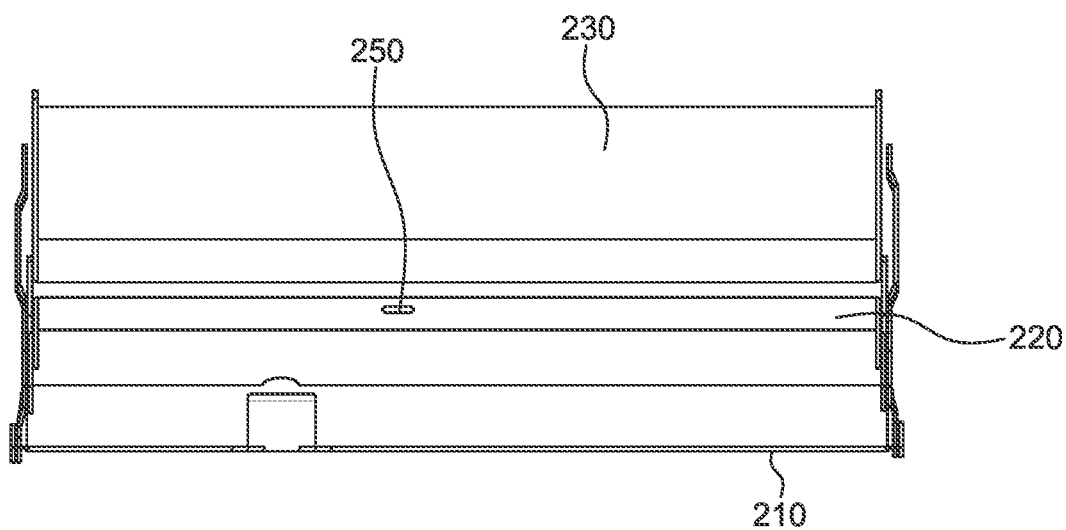
FIG. 14 is a rear view of portions of the extendable arm assembly according to the embodiment of FIGS. 10-13.
Figure 15:
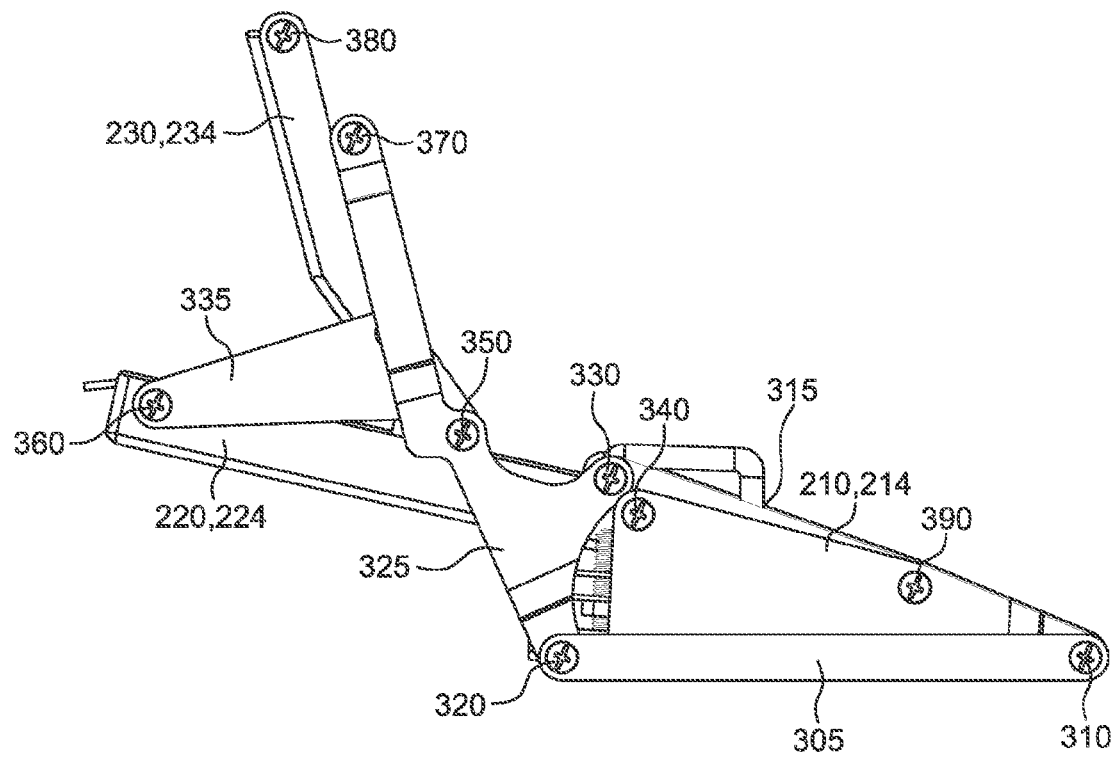
FIGS. 15-18 are left side views of components of the extendable arm assembly according to an embodiment.
Figure 16:
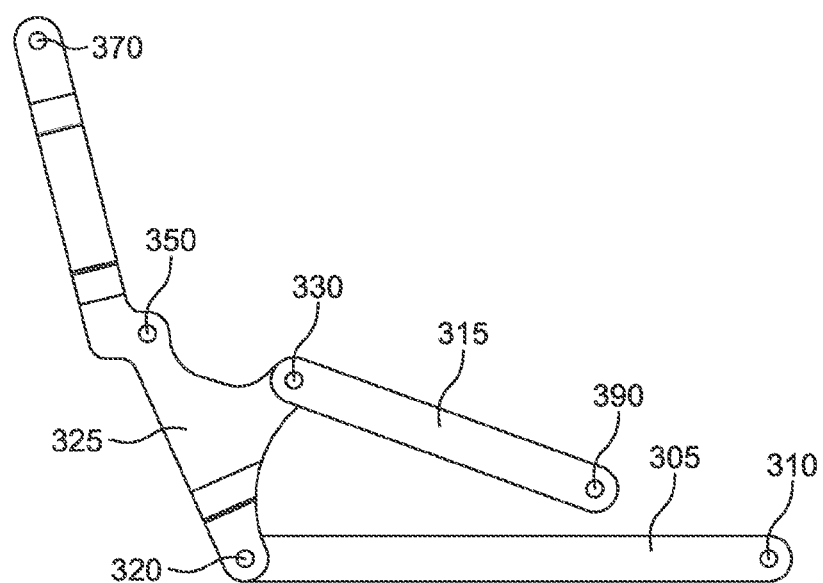
Figure 17:
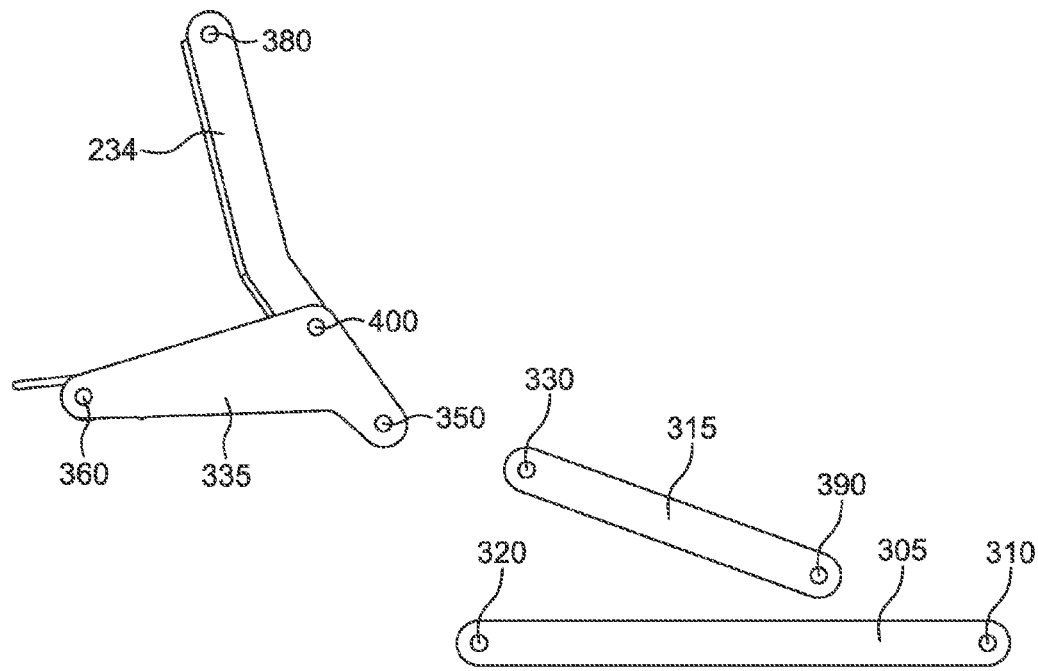
Figure 18:
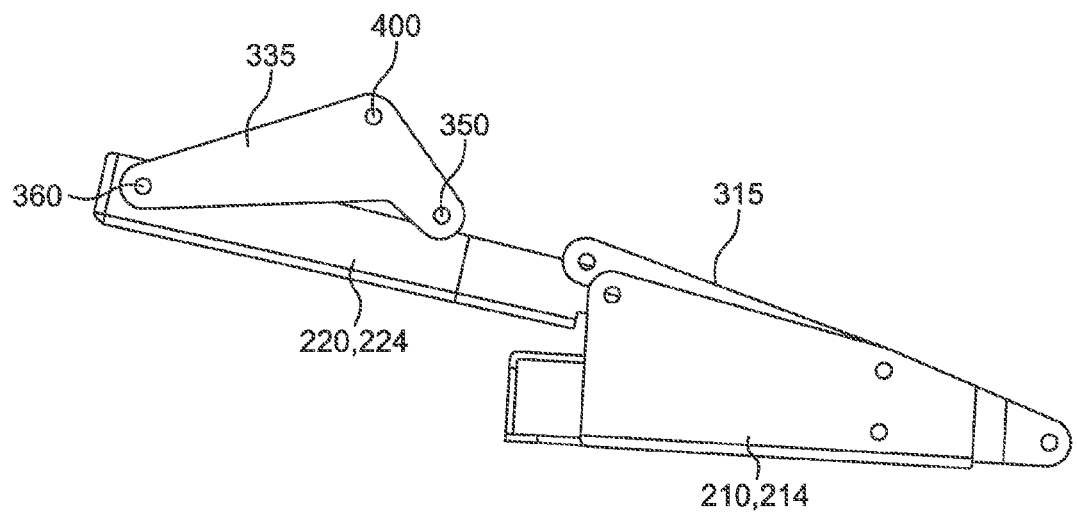

Referring to FIGS. 10 to 12, the arms 305, 315, 325, 335 and 345 and the members 210, 220, 230, and 240 comprise vertical components of non-planar configurations. The non-planar configurations result from material folds to provide clearance for displacement of complementary parts and parallel surfaces for mounting. The bridge members 86 are therefore mounted to the interior of the mounting components and have the exterior faces of their side flanges not aligned with each other.

Guiding Components

Referring to FIG. 3, according to an embodiment, the extendable arm assembly 80 comprises a guiding component (not shown) guiding the control cable 62 when the extendable arm assembly 80 is displaced between its compact configuration and its extended configuration. The guiding component 90 prevents the control cable 62 from being pinched between arms or between bridge members 86. According to an embodiment, the guiding component consists in a guiding chain such as the Energy Chain System from Igus (http://www.igus.com/us/pdf/se14.pdf) that limits the possible path of the cable. According to an embodiment, the guiding component 90 comprises one or more pulleys or pairs of rollers providing a path for the control cable 62 while allowing longitudinal displacement of the control cable 62. According to an embodiment, one guiding component 90 is mounted on a resilient component 92, such as a spring, applying a force on the control cable 62 pulling it away from obstacles. According to one embodiment, the resilient component 92, for example a spring, is for modifying the path of the control cable to take care of loose length of the control cable 62 when the extendable arm assembly 80 is in a compact configuration.

Additional Degrees of Freedom

According to an embodiment, the control panel 52 is mounted to the head support member 240 to offer additional degrees of freedom.

According to a first set of embodiments, the control panel 52 is rotationally mounted to the head support member 240 according to a horizontal-like rotational axis. According to an embodiment, the rotational axis is located at the head of the control panel 52 and the head support member 240. Therefore, the control panel 52 may rotate from a first angle where the back of the control panel 52 contacts the head support member 240 to a second angle with space therebetween and the control panel 52 having its operative face 122 closer to a horizontal position.

According to a second set of embodiments, the control panel 52 is also rotationally mounted to the head support member 240 according to a horizontal-like rotational axis. According to an embodiment, the rotational axis is located at the bottom of the control panel 52 and the head support member 240. Therefore, the control panel 52 may rotate from a first angle where the back of the control panel 52 contacts the head support member 240 to a second angle with space therebetween and the control panel 52 having its operative face 122 may face less towards the sky.

According to another set of embodiments, the control panel 52 is rotationally mounted at a distance from the head support member 240 according to a single-direction or multi-directional rotation-free mounting head. According to embodiments, the mounting head may be located substantially at the center of the head support member 240, or offset to one side and/or to the top or bottom of the head support member 240. According to embodiments, the number of degrees of freedom and the amplitude of movement provided by the mounting components of the control panel 52 may vary. Resulting from these capabilities of an operator to modify the orientation of the control panel 52, the ergonomic characteristics of use, as the safety of use of the control panel 52 are increased.

According to another embodiment, the control panel 52 is mounted to the head support member 240 using sliding components. Accordingly, by sliding the control panel 52 downwardly or upwardly, an operator sets the height of the control panel 52 as the distance of the control panel 52 relative to the body 12 of the wrecker 10.

According to embodiments, orientation locking components are present allowing an operator to lock the control panel 52 at a preferred orientation once an orientation of the control panel 52 is set. Such orientation locking components may comprise tightening handles combined with the rotational axis components, arm assembly or alternative components adjustable as the operation angle of the control panel 52 is adjusted.

Methods

According to an embodiment, a method of operating the control panel assembly comprises a) providing the extendable arm assembly 80 mounted to the control cabinet 40 at an anchoring point 85 with the extendable arm assembly 80 comprising arms which are foldable relative to each other; b) applying a pulling force over one of the control panel 52 (the handle 112) and a part of the extendable arm assembly 80, whereby the arms of the extendable arm assembly 80 unfold from each other and the wrecker controls 50 exit the control cabinet 40; and c) operating the control panel 52 located outside the control cabinet 40.

According to an embodiment, the method further comprises to open the door 162 before applying a pulling force.

According to an embodiment, the method further comprises applying a pushing force over one of the control panel 52 (the handle 112) and a part of the extendable arm assembly 80, whereby the arms of the extendable arm assembly 80 fold relative to each other and the wrecker controls 50 enter the control cabinet 40. The method may further comprise closing the door of 162 the control cabinet 40 when the control panel 52 is in the control cabinet 40.

According to an embodiment illustrated through FIGS. 6-7, a method of mounting a control panel 52 to a control cabinet 40 of a wrecker 10 comprises: a) mounting the extendable arm assembly 80 to an anchoring point located inside the control cabinet 40; b) mounting the control panel 52 to the head support member 240 with the control panel 52 having its operative face 122 facing backward; c) connecting the control panel 52 to a control bus port 60 located in the control cabinet 40; d) rotating the head support member 240 around the axis 370 for the control panel 52 to have its operative face 122 facing forward; and e) mounting the head support member 240 to the extendable arm assembly 80, wherein the control panel 52 is movable between an inner position and an outer position with the control panel 52 having its operative face 122 facing forward.

According to an embodiment, the method further comprises connecting a control cable 62 connecting the control panel 52 to the control bus port 60, and guiding the control cable 62 through a guiding component 90 thereby preventing the control cable 62 from contacting the arms of the extendable arm assembly 80.

According to an embodiment, the method comprises connecting a cable between the control panel 52 and the static control panel 54, with one of the control panel 52 and the static control panel 54 operating as a relay for the other.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A control panel assembly for mounting to an interior compartment of a wrecker, the control panel assembly comprising:
   an extendable arm assembly mounted to the interior compartment, the extendable arm assembly comprises arms which are foldable relative to each other for adopting a compact configuration and an extended configuration; and
   a control panel mounted to the extendable arm assembly, wherein the control panel comprises wrecker controls;
   wherein the control panel is movable between an inner position, wherein the extendable arm assembly is in the compact configuration and the wrecker controls are located within the interior compartment, and an outer position, wherein the extendable arm assembly is in the extended configuration and the wrecker controls are located outside the interior compartment.

2. The control panel assembly of claim 1, wherein the extendable arm assembly, when deployed from the compact configuration to the extended configuration, imparts a movement to the control panel between the inner position and the outer position which follows an arc.

3. The control panel assembly of claim 1, wherein the control panel is substantially within a plane at a given angle and the given angle remains substantially the same during a movement of the control panel between the inner position and the outer position.

4. The control panel assembly of claim 1, wherein the extendable arm assembly comprises a left arm assembly, a right arm assembly and bridge assembly connecting the left arm assembly and the right arm assembly.

5. The control panel assembly of claim 4, wherein the left arm assembly operates substantially according to a left operative plane, the right arm assembly operates substantially according to a right operative plane, and wherein the left operative plane and the right operative plane are parallel to each other.

6. The control panel assembly of claim 5, wherein the extendable arm assembly comprises a plurality of rotational axes about which at least two of the arms of the extendable arm assembly fold about each other.

7. The control panel assembly of claim 6, wherein the arms comprise a long arm with a proximal and a distal rotational axes, a short arm with a proximal and a distal rotational axes and a first intermediate arm comprising rotational axes, wherein two of the rotation axes of the first intermediate arm are respectively connected to the distal rotational axis of the short arm and to the distal rotational axis of the long arm, the proximal rotational axis of the long arm being forward and below the proximal rotational axis of the short arm, the distal rotational axis of the long arm being rearward and below the distal rotational axis of the short arm, wherein a deployment of the extendable arm assembly from the compact configuration to the extended configuration imparts a movement to the first intermediate arm which follows an arc and imparts a rotation of the first intermediate arm.

8. The control panel assembly of claim 7, wherein the arms comprise a second intermediate arm with two rotational axes and extendable arm assembly comprises a head support member flange with two rotational axes, wherein the first intermediate arm comprises four rotational axes, wherein a first one of the four rotational axes is connected to the distal rotational axis of the long arm, a second one of the four rotational axes is connected to the distal rotational axis of the short arm, a third one of the four rotational axes is connected to a first one of the two rotational axes of the second intermediate arm and a fourth one of the four rotational axes is connected to one of the two rotational axes of the head support member flange, wherein the control panel is mounted to the extendable arm assembly through head support member flange.

9. The control panel assembly of claim 8, wherein a distance between the two rotational axes of the head support member flange is equal to a distance between the third one of the four rotational axes of the first intermediate arm and a second one of the two rotational axes of the second intermediate arm.

10. The control panel assembly of claim 1, wherein the interior compartment comprises a framing member defining an opening through which the control panel exits when moving from the inner position to the outer position, wherein at least part of the control panel in the outer position is located below the opening.

11. The control panel assembly of claim 1, wherein the interior compartment comprises an opening and a door for closing the opening, and wherein the extendable arm assembly operates independently from the door.

12. The control panel assembly of claim 1, wherein the interior compartment further comprises a control bus port, and wherein the control panel assembly further comprises a control cable connected to the control bus port.

13. The control panel assembly of claim 1, further comprising a head support member mounted to the extendable arm assembly, the head support member comprises a connecting surface which is substantially flat and on which the control panel is mounted.

14. The control panel assembly of claim 3, wherein the connecting surface is substantially within a plane at a given angle and the given angle remains substantially the same during a movement of the connecting surface between the inner position and the outer position.

15. A method of operating a control panel assembly comprising wrecker controls, the control panel being mounted to an interior compartment of a wrecker, the method comprising:
   providing an extendable arm assembly mounted to the interior compartment, the extendable arm assembly comprising arms which are foldable relative to each other;
   applying a pulling force on at least one of the control panel and a part of the extendable arm assembly, whereby the extendable arm assembly has arms which unfold from each other and the wrecker controls exit the interior compartment; and
   operating the control panel located outside the interior compartment.

16. The method of claim 15, further comprising opening a door which prevents access to the interior compartment, wherein the steps of opening the door and applying a pulling force are performed independently from each other.

17. The method of claim 15, further comprising:
   applying a pushing force over one of the control panel and a part of the extendable arm assembly, whereby the extendable arm assembly has arms folding relative to each other and the wrecker controls enter the interior compartment; and
   closing the door, thereby preventing access to the interior compartment.

18. A wrecker comprising:
   a body;
   an interior compartment supported by the body;
   control panel assembly for mounting within the interior compartment, the control panel assembly comprising:
      an extendable arm assembly mounted to the interior compartment, the extendable arm assembly comprises arms which are foldable relative to each other for adopting a compact configuration and an extended configuration; and
      a control panel mounted to the extendable arm assembly, wherein the control panel comprises wrecker controls;
      wherein the control panel is movable between an inner position, wherein the extendable arm assembly is in the compact configuration and the wrecker controls are located within the interior compartment, and an outer position, wherein the extendable arm assembly is in the extended configuration and the wrecker controls are located outside the interior compartment.

19. The wrecker of claim 18, wherein the extendable arm assembly, when deployed from the compact configuration to the extended configuration, imparts a movement to the control panel between the inner position and the outer position which follows an arc.

20. The wrecker of claim 18, wherein the control panel is substantially within a plane at a given angle and the given angle remains substantially the same during a movement of the control panel between the inner position and the outer position.

* * * * *